(12) United States Patent
Whitaker

(10) Patent No.: US 8,720,894 B2
(45) Date of Patent: May 13, 2014

(54) GROUND PREPARATION APPARATUS

(71) Applicant: Korey K. Whitaker, Morgan, UT (US)

(72) Inventor: Korey K. Whitaker, Morgan, UT (US)

( * ) Notice: Subject to any disclaimer, the term of this patent is extended or adjusted under 35 U.S.C. 154(b) by 0 days.

(21) Appl. No.: 14/094,303

(22) Filed: Dec. 2, 2013

(65) Prior Publication Data

US 2014/0076593 A1 Mar. 20, 2014

Related U.S. Application Data

(60) Provisional application No. 61/768,459, filed on Feb. 23, 2013.

(51) Int. Cl.
*A63B 67/00* (2006.01)
*A01B 23/00* (2006.01)

(52) U.S. Cl.
USPC .......................................... 273/359; 172/766

(58) Field of Classification Search
USPC .................. 273/359, 366–370; 172/452, 512, 172/799.5, 160, 177, 198, 766
See application file for complete search history.

(56) References Cited

U.S. PATENT DOCUMENTS

| | | | | |
|---|---|---|---|---|
| 1,395,329 A | * | 11/1921 | Aton et al. | 172/140 |
| 2,299,334 A | * | 10/1942 | Matter | 172/532 |
| 2,445,267 A | * | 7/1948 | Hilblom | 56/386 |
| 2,526,028 A | * | 10/1950 | Johnson | 56/15.1 |
| 3,974,799 A | * | 8/1976 | Parsons | 273/336 |
| 4,073,346 A | * | 2/1978 | Groth et al. | 172/439 |
| 4,136,874 A | * | 1/1979 | McCord | 273/339 |
| 4,308,921 A | * | 1/1982 | Davis | 172/488 |
| 4,451,045 A | * | 5/1984 | Fesmire | 273/338 |
| 4,662,642 A | | 5/1987 | Archibald et al. | 273/339 |
| 4,874,179 A | | 10/1989 | Henderson | 273/338 |
| 5,009,432 A | * | 4/1991 | Richard | 273/339 |
| 5,062,488 A | * | 11/1991 | Lochmiller | 172/1 |
| 5,709,386 A | * | 1/1998 | Nelson | 273/370 |
| 5,794,714 A | * | 8/1998 | Brown | 172/799.5 |
| 6,736,399 B1 | * | 5/2004 | Copenhaver | 273/339 |
| 6,945,534 B1 | * | 9/2005 | Lindsey | 273/359 |
| 7,430,990 B1 | * | 10/2008 | Copenhaver | 119/839 |
| 8,079,422 B2 | * | 12/2011 | Maas et al. | 172/21 |
| 8,297,980 B2 | * | 10/2012 | Reynolds | 434/225 |
| 2006/0170163 A1 | * | 8/2006 | Perkins | 273/359 |
| 2006/0243463 A1 | * | 11/2006 | Mensch | 172/245 |
| 2013/0026688 A1 | | 1/2013 | McCarthy | 267/138 |

\* cited by examiner

*Primary Examiner* — Mark Graham

(74) *Attorney, Agent, or Firm* — Michael R. Schramm

(57) ABSTRACT

The present invention is a ground preparation apparatus for use in maintaining substantially uniformly soft and smooth soil while providing a movable roping target. The apparatus is usefully in avoiding the need to separately maintain ground to be used in roping practice while at the same time providing a moving roping target.

20 Claims, 4 Drawing Sheets

GROUND PREPARATION APPARATUS

CROSS REFERENCE TO RELATED APPLICATIONS

This US nonprovisional utility patent application claims the benefit under 35 USC §119(e) of U.S. provisional application No. 61/768,459 filed Feb. 23, 2013 which is expressly incorporated herein in its entirety by this reference.

FIELD OF THE INVENTION

The present invention relates to ground preparation devices such as rakes, tillers, disks, harrows, and floats, and more especially ground preparation devices for use in combination with towable roping machines (TRM) or like towable roping targets (roping dummies).

BACKGROUND OF THE INVENTION

Ground preparation devices such as rakes, tillers, disks, harrows, and floats are well known in the ground preparation industry for use in preparing ground for various subsequent uses such as cultivating the ground or recreating on the ground such as in rodeo use of the ground (see Appx A for an exemplary harrow). When using a piece of ground for roping and rodeo purposes, it is preferable that the ground be prepared to provide uniformly soft and smooth ground to provide for good traction and to provide for a soft landing for those using the ground. Further, TRMs—towable machines having a roping target in the likeness of a calf, a bull, or like animal— are well known in the roping and rodeo industry for use in roping practice to improve roping accuracy and skills in general (see Appx B for an exemplary roping machine). However, use of such TRMs tends to cause soil compaction and/or tracks and ruts in the ground. Heretofore, using TRMs has required the periodic pausing of TRM use, re-grooming of the ground with a separate dedicated ground preparation apparatus (e.g. a tractor with a tiller or harrow), and then resumption of use of the TRM.

SUMMARY OF THE INVENTION

The present invention is a ground preparation and maintenance device for use in combination with and for towing behind a TRM so as to prevent soil compaction and so as to maintain substantially uniformly soft and smooth soil without requiring axially or secondary ground preparation and maintenance devices (e.g. separate tractor use)—the combination of the TRM and the ground preparation device constituting the ground preparation apparatus. The device preferably defines a rake-like harrow that is adapted so as to be connected behind a towable roping machine and so as to prevent soil compaction (or tracks or ruts in the soil) and to maintain the ground over which the apparatus is towed, in a prepared condition.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
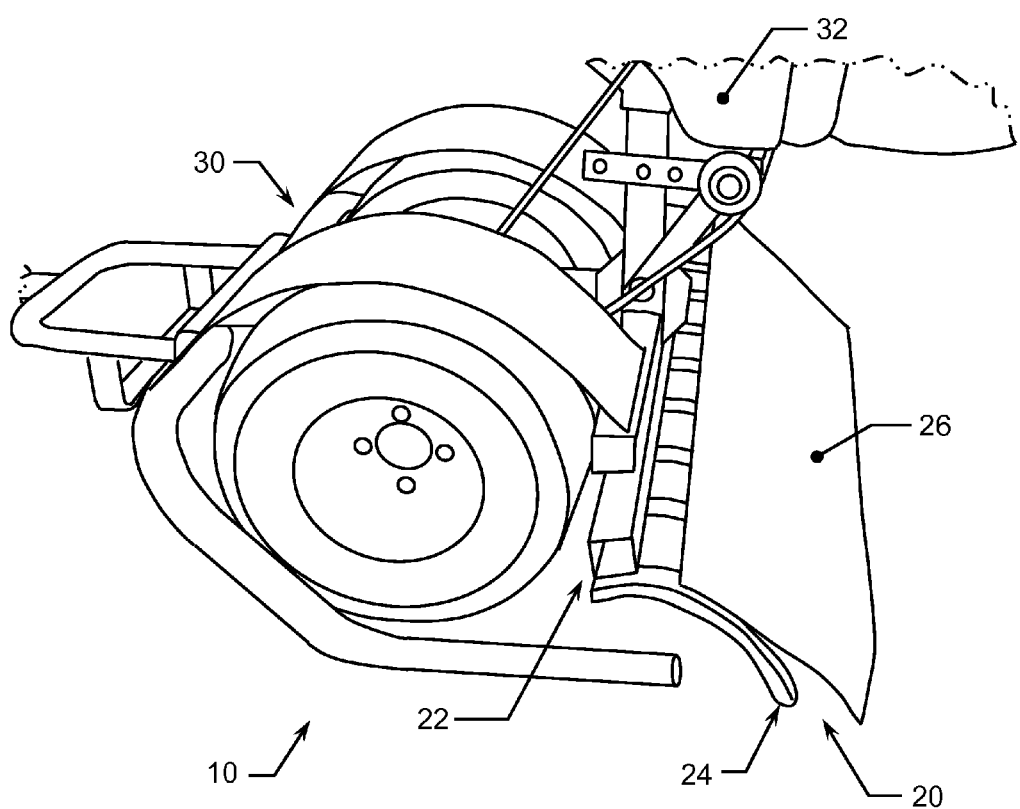
FIG. 1 is a trimetric view of the ground preparation apparatus in a static orientation with the ground preparation device in a lowered position.
Figure 2:
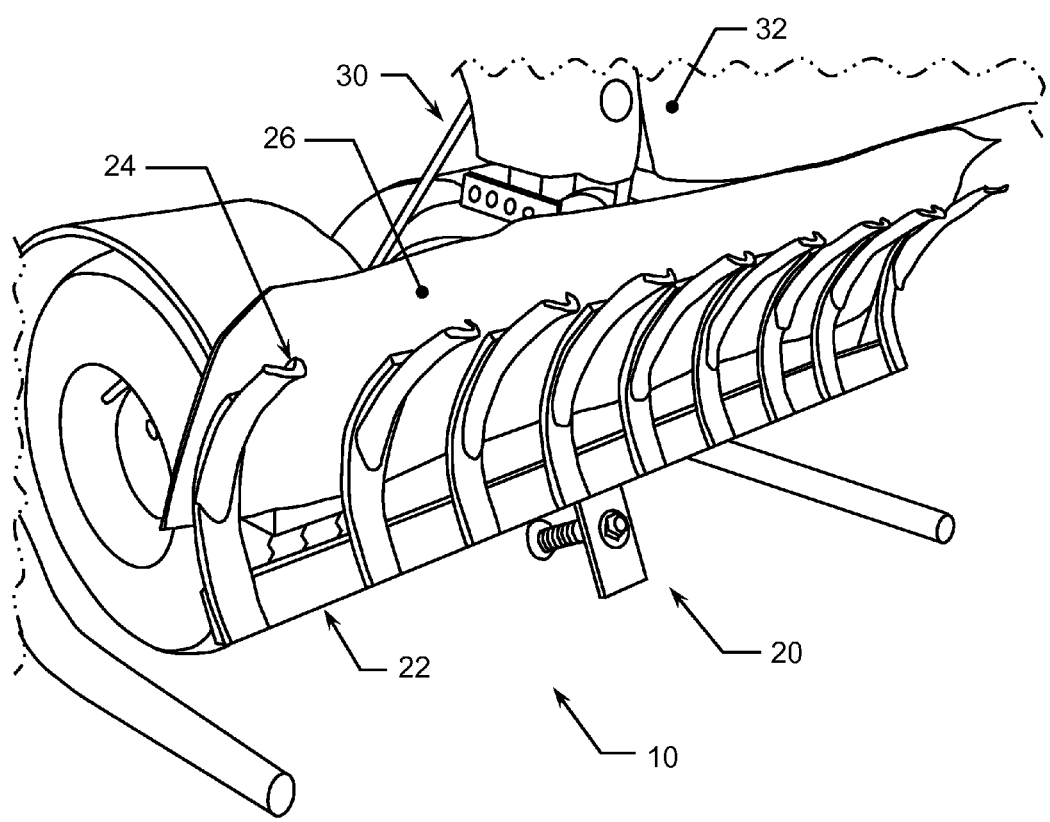
FIG. 2 is a trimetric view of the ground preparation apparatus in a static orientation with the ground preparation device in a raised position.
Figure 3:
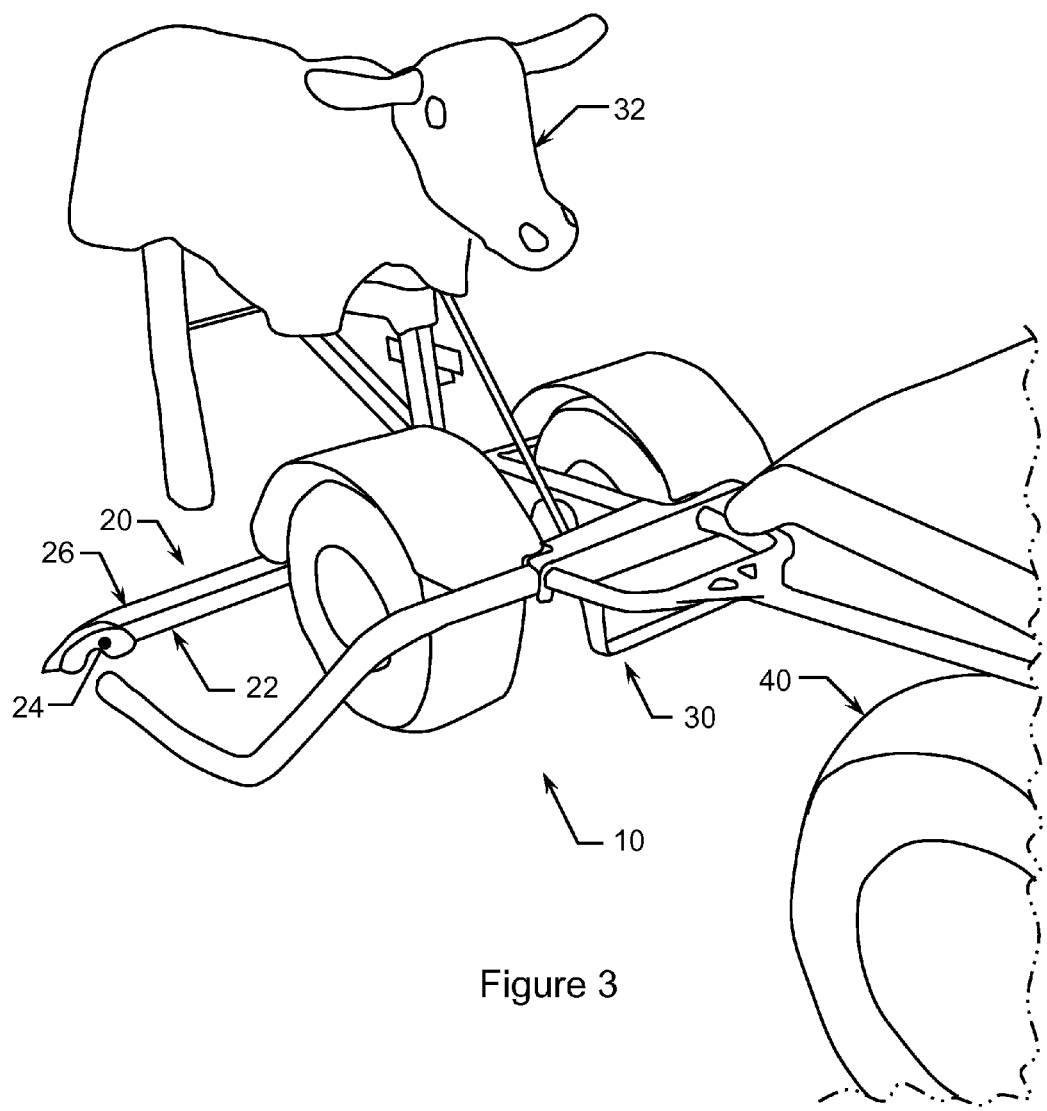
FIG. 3 is a front trimetric view of the ground preparation apparatus in an in-transit towing orientation.
Figure 4:
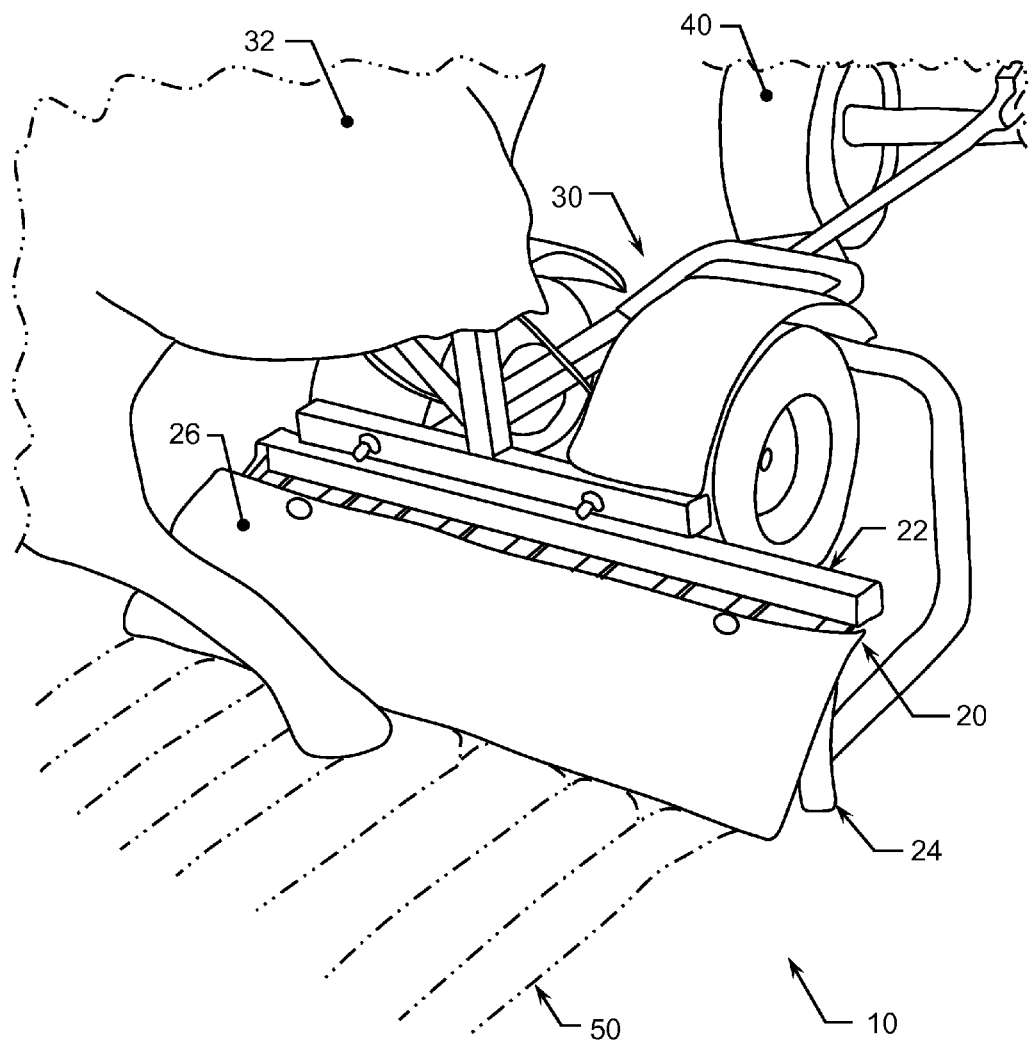
FIG. 4 is a rear trimetric view of the ground preparation apparatus in an in-transit towing orientation.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature list is provided below. It is noted that like features are like numbered throughout all of the figures.

FEATURE TABLE

| # | Feature | # | Feature |
|---|---|---|---|
| 10 | Ground preparation apparatus | | |
| 20 | Ground preparation device | 22 | Rake Harrow |
| 24 | Tines | 26 | Cover float 24 |
| 30 | Towable roping machine | 32 | Animal simulating roping target |
| 40 | ATV | 50 | Furrows |

Referring now to the drawings, the invention is a ground preparation apparatus 10 for use in maintaining substantially uniformly soft and smooth soil while providing a movable roping target, comprising ground preparation device 20 connected to towable roping machine 30. Towable roping machine 30 further defines any of preferably commercially available TRMs being adapted for towing and preferably including animal simulating roping target 32. Ground preparation device 20 further defines rake harrow 22 having a plurality of tines 24 combined with cover float 26 and adapted to connect to the rear of towable roping machine 30.

In practice, ground preparation apparatus 10 is hitched to a tow vehicle such as ATV (4-wheeler) 40 and towed around a rodeo area or like practice grounds to provide for a realistically simulated moving animal roping target while simultaneously preparing and/or maintain the rodeo arena ground. More specifically, the tines 24 of rake harrow 22 of ground preparation device 20 dig (relatively) small grooves or furrows 50 into the ground to break-up and loosen the ground, and cover float 26 that trails immediately behind rake harrow 22, substantially prevents dirt from flying up behind ground preparation apparatus 10 and substantially smoothes the ground behind ground preparation apparatus 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A ground preparation apparatus adapted to be towed having a ground engaging member adapted to dig and loosen soil when towed connected to a towable roping target member with a frame having a body resembling livestock mounted thereon and adapted to provide a moving simulated target for roping practice.

2. The apparatus of claim 1, wherein said ground engaging member further defines a rake having a plurality of tines.

3. The apparatus of claim 2, wherein said ground engaging member further includes a cover.

4. The apparatus of claim 1, wherein said body further defines a simulated bovine.

5. The apparatus of claim 1, wherein said body simulates a run pattern when said roping target is towed.

6. The apparatus of claim 1, wherein when said apparatus is moved across a ground surface, said ground surface is loosened and smoothed while said towable roping target is animated.

7. The apparatus of claim 1, wherein said ground engaging member is adapted to be positioned in a lowered position and a raised position with respect to said towable roping target member.

8. A combined ground preparation and roping target apparatus being adapted to be towed and having a ground grooming member adapted to dig and loosen soil and a frame having a body resembling livestock mounted thereon providing a roping target member.

9. The apparatus of claim 8, wherein said ground grooming member further defines a rake having a plurality of tines.

10. The apparatus of claim 9, wherein said ground grooming member further includes a cover.

11. The apparatus of claim 8, wherein said body simulates a run pattern when said apparatus is towed.

12. The apparatus of claim 8, wherein said body further defines a simulated bovine.

13. The apparatus of claim 8, wherein when said apparatus is moved across a ground surface, said ground surface is groomed by loosening and smoothing soil while said towable roping target is animated.

14. The apparatus of claim 8, wherein said ground grooming member is adapted to be positioned in a lowered position and a raised position with respect to said roping target member.

15. A ground preparation apparatus adapted to be towed having a tined ground engaging member connected to a roping target member with a frame having a body resembling livestock mounted thereon and adapted such that when towed, said ground engaging member loosens and smoothes soil while said roping target member provides an animated livestock run pattern for use in roping practice.

16. The apparatus of claim 15, wherein said ground engaging member further defines a rake having a plurality of tines.

17. The apparatus of claim 16, wherein said ground engaging member further includes a cover, and wherein said cover is adapted to trail said apparatus so as to smooth ground behind said apparatus.

18. The apparatus of claim 15, wherein said body further defines a simulated bovine.

19. The apparatus of claim 15, wherein said ground engaging member is positioned such that when said apparatus is towed across a ground surface, said ground engaging member is the last portion of said apparatus to touch ground across which said apparatus is towed.

20. The apparatus of claim 15, wherein said ground engaging member is adapted to be positioned in a lowered position and a raised position with respect to said roping target member.

\* \* \* \* \*